(12) United States Patent
Jeong et al.

(10) Patent No.: US 8,508,527 B2
(45) Date of Patent: Aug. 13, 2013

(54) APPARATUS AND METHOD OF BUILDING MAP FOR MOBILE ROBOT

(75) Inventors: Woo-yeon Jeong, Seoul (KR); Su-Jin Lee, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 924 days.

(21) Appl. No.: 12/320,289

(22) Filed: Jan. 22, 2009

(65) Prior Publication Data

US 2010/0001991 A1     Jan. 7, 2010

(30) Foreign Application Priority Data

Jul. 7, 2008    (KR) .............................. 10-2008-65539

(51) Int. Cl.
*G06F 17/00*        (2006.01)

(52) U.S. Cl.
USPC ........................................................ 345/418

(58) Field of Classification Search
USPC ........................................................ 345/418
See application file for complete search history.

(56) References Cited

U.S. PATENT DOCUMENTS

| | | | | |
|---|---|---|---|---|
| 5,793,934 | A * | 8/1998 | Bauer ............................ | 700/250 |
| 2004/0016077 | A1 * | 1/2004 | Song et al. ....................... | 15/319 |
| 2004/0167716 | A1 | 8/2004 | Goncalves et al. | |
| 2004/0230340 | A1 * | 11/2004 | Fukuchi et al. ................ | 700/245 |
| 2005/0065655 | A1 * | 3/2005 | Hong et al. ..................... | 700/245 |
| 2005/0107947 | A1 * | 5/2005 | Han et al. ....................... | 701/207 |
| 2006/0132502 | A1 | 6/2006 | Harviill | |
| 2006/0176468 | A1 * | 8/2006 | Anderson et al. ............. | 356/5.01 |
| 2006/0293810 | A1 * | 12/2006 | Nakamoto ....................... | 701/28 |
| 2007/0156286 | A1 * | 7/2007 | Yamauchi ....................... | 700/245 |
| 2007/0293985 | A1 * | 12/2007 | Myeong et al. ................ | 700/245 |
| 2009/0248305 | A1 * | 10/2009 | Nakano .......................... | 701/223 |
| 2009/0312871 | A1 * | 12/2009 | Lee et al. ........................ | 700/259 |

FOREIGN PATENT DOCUMENTS

| | | |
|---|---|---|
| EP | 1 684 143 | 7/2006 |
| JP | 2001-118187 | 4/2001 |
| KR | 2004-0029493 | 4/2004 |
| KR | 20060089354 | 8/2006 |
| WO | WO2004-113836 | 12/2004 |
| WO | 2006/090896 | 8/2006 |

OTHER PUBLICATIONS

Fukuda T et al: "Navigation System Based on Ceiling Landmark Recognition for Autonomous Mobile Robot", Industrial Electronics, Control, and Instrumentation, 1993. Proceeding S of the IECON '93, International Conference on Maui, HI, USA Nov. 15-19, 1993, New York, NY, USA, IEEE LNKD-DOI: 10.1109/IECON.1993.339287, Nov. 15, 1993 pp. 1466-1471.

Extended European Search report issued Jul. 7, 2010 corresponds to European Patent Application 09153114.5.

* cited by examiner

*Primary Examiner* — Jeffrey Chow

(74) *Attorney, Agent, or Firm* — Staas & Halsey LLP

(57) ABSTRACT

Localization and map building apparatus and method applicable to a mobile robot are provided. In an exemplary embodiment, a map building apparatus extracts a pattern of landmarks of the same kind and adjusts a landmark map using the extracted pattern when generating the landmark map for localization. Accordingly, since the landmark map is adjusted based on the pattern extracted on the basis of location information of each landmark, accuracy of localization and map building of the mobile robot can be improved.

16 Claims, 6 Drawing Sheets

APPARATUS AND METHOD OF BUILDING MAP FOR MOBILE ROBOT

CROSS-REFERENCE TO RELATED APPLICATIONS

This application claims the benefit under 35 U.S.C. §119(a) of Korean Patent Application No. 10-2008-65539, filed on Jul. 7, 2008, the disclosure of which is incorporated herein in its entirety by reference.

BACKGROUND

1. Field

One or more embodiments within the following description relate to localization and map building, and more particularly, to an apparatus and a method of localization and map building which are applied to a mobile robot.

2. Description of the Related Art

Mobile objects such as autonomic mobile robots have a basic function that moves to a destination without collisions. Such function is implemented based on localization and mapping technologies. Simultaneous Localization and Mapping (SLAM) algorithm is used for localization of a robot itself and mapping. Through the SLAM algorithm, a map is built for surroundings of a robot at a specific location and a location of the moving robot is identified based on the built map. Such procedures are repeated to estimate the location of the robot and build a map of surrounds where the robot is located simultaneously.

A mobile robot measures a moving distance generally by using a laser scanner and an odometer to build a map. However, in the course of executing the SLAM algorithm, due to the various unpredictable variations, such as a feature point extraction error, an unknown odometry error, a camera geometry error, there is a problem that errors may become compounded.

SUMMARY

Accordingly, in one aspect, there is provided map building apparatus and method which uses a pattern extracted based on locations of landmarks identified from image information and thus may reduce localization error occurring in the course of performing Simultaneous Localization and Mapping (SLAM) algorithm.

According to another aspect, there is provided a map building apparatus including a landmark map generating unit which generates a landmark map which includes location information and respective local images of each of a plurality of landmarks, a pattern extracting unit which extracts a pattern formed by landmarks, of the plurality of landmarks, identified as being of a same kind by use of the location information and the local images, and a landmark map adjusting unit which adjusts the landmark map by use of the extracted pattern formed by the landmarks of the identified same kind.

The pattern extracting unit may group together landmarks of the identified same kind based on similarities of the local images of the landmarks and extract the pattern formed by the landmarks of the identified same kind by use of the location information. The extracted pattern formed by the landmarks of the identified same kind may be at least one of a straight line, a circle, and a rectangle.

The map building apparatus may further include an image capturing unit which is configured to capture an image of a ceiling and obtains the respective local images for respective landmarks from the ceiling image. Also, the map building apparatus may further include a grid map generating unit which generates a grid map, wherein the pattern extracting unit extracts a pattern of obstacle information from the grid map and compares the extracted pattern of obstacle information with the extracted pattern formed by the landmarks of the identified same kind, and the landmark map adjusting unit adjusts the landmark map based on a result of the comparison.

The landmark map adjusting unit may adjust locations of the landmarks to be perpendicular or parallel to a straight line corresponding to the extracted pattern of obstacle information when the extracted pattern of obstacle information and the extracted pattern formed by the landmarks of the identified same kind are determined to be straight lines. When the extracted pattern formed by the landmarks of the identified same kind is determined to be a straight line, the landmark map adjusting unit may reposition the landmarks to be placed on a corresponding straight line.

The map building apparatus may be a mobile robot of which location is recognized and movement is controlled based on the adjusted landmark map.

According to still another aspect, there is provided a map building method including generating a landmark map including location information and respective local images of each of a plurality of landmarks, extracting a pattern formed by landmarks, of the plurality of landmarks, identified as being of a same kind by use of the location information and the local images, and adjusting the landmark map by use of the extracted pattern formed by the landmarks of the identified same kind.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1:
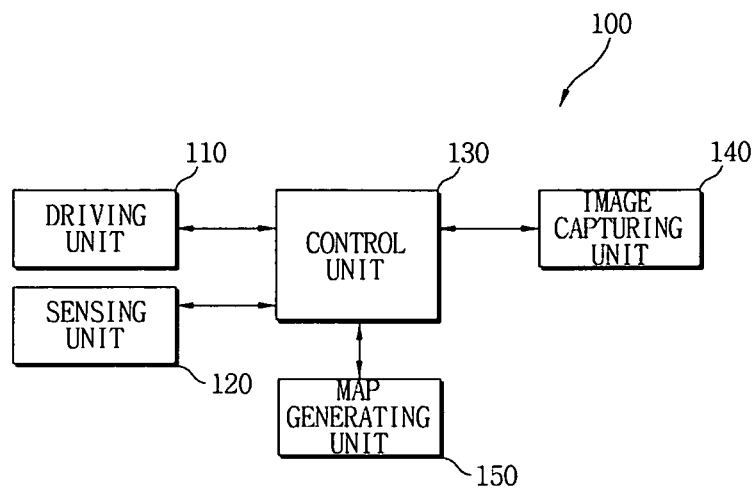
FIG. 1 is a block diagram of a structure of a mobile robot according to an exemplary embodiment.

Reference will now be made in detail to embodiments, examples of which are illustrated in the accompanying drawings, wherein like reference numerals refer to the like elements throughout. Embodiments are described below to explain the present invention by referring to the figures.

Further, the corresponding following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art.

FIG. 1 is a block diagram illustrating a structure of a mobile robot 100 according to an exemplary embodiment. Referring to FIG. 1, the mobile robot 100 includes a driving unit 110, sensing unit 120, a control unit 130, an image capturing unit 140, and a map generating unit 150.

The driving unit 110 may include a plurality of wheels for moving the mobile robot 100 and a power source for providing a driving force to the wheels. The sensing unit 120 is mounted on the mobile robot 100 to sense the amount of movement and rotation. To this end, the sensing unit 120 may include an encoder or a gyro sensor. For example, an encoder integrates the moving distance and direction of the mobile robot 100, thereby enabling to estimate a position and a directional angle in a two dimensional coordinate space, that is, a pose of the mobile robot 100. Generally, the estimation by the encoder is comparatively accurate for a short range, but errors become compounded as the integral is continually performed.

The control unit 130 controls data transmission/receipt between units 110, 120, 140, and 150 of the mobile robot 100 to control the mobile robot 100 entirely. The control unit 130 receives data on the amount of movement and the amount of rotation, respectively, from the driving unit 110 and the sensing unit 120 to recognize the current location of the mobile robot 100, and controls the driving unit 110 to control the movement of the mobile robot 100 according to the location recognition result.

The control unit 130 can recognize the location of the mobile robot 100 based on landmarks, that is, features, the mobile robot 100 has identified. Therefore, to precisely recognize the location of the mobile robot 100, the recognition of precise locations of landmarks the mobile robot 100 has identified is prerequisite.

According to an exemplary embodiment, landmarks refer to features such as edges or corners that define a shape of an object and can be extracted from a ceiling image. Such features become the base of a landmark map. Furthermore, the landmark may be lines or points extracted from a contour of a closed region for the case where the features cannot be extracted. For example, when it is difficult to identify features on the indoor ceiling, lines or points may be extracted from the contour of a light of a ceiling image, which may be circular or rectangular.

Furthermore, according to an exemplary embodiment, the control unit 130 may recognize the location based on a landmark map adjusted by the map generating unit 150.

The image capturing unit 140 captures an external image and converts the captured image into a digital signal. The image capturing unit 140 may be composed of a charged coupled device (CCD) module or a complementary metal oxide semiconductor (CMOS) module. The image capturing unit 140 photographs objects placed above the image capturing unit 140 and perpendicular to a moving direction of the mobile robot 100 to obtain a ceiling image. Additionally, the image capturing unit 140 may extract a landmark from the ceiling image, and obtain a local image corresponding to the extracted landmark. The landmark can be detected by the well-known Harris corner detection method or a split and merge algorithm.

The map generating unit 150 builds a map necessary when the mobile robot 100 is moving. The map generating unit 150 may generate a grid map and a landmark map.

The grid map is also referred to as a probability grid map which divides the surroundings of an autonomous mobile robot into small grid squares to represent the probability of existence of an object in each grid square. The grid map may be generated by use of location information based on the amount of the movement and the rotation of the mobile robot 100 and obstacle detection information from the sensing unit 120. Furthermore, the map generating unit 150 may generate a landmark map using location information from the driving unit 110 and ceiling image information from the image capturing unit 140.

Most artificial structures may have a ceiling with repetitive patterns thereon or a regular rule in which the direction of a line extracted from the ceiling is identical with or perpendicular to a direction of an actual obstacle or a direction of a wall. Hence, the map generating unit 150 uses the regularity of a pattern to adjust the landmark map.

To this end, the map generating unit 150 extracts landmarks, and a pattern composed of the same kind of landmarks may be extracted based on a location relationship between landmarks of the same kind. The pattern may be at least one of a line, a circle and a rectangle. The map generating unit 150 may adjust a previously generated landmark based on the extracted pattern.

Figure 2:
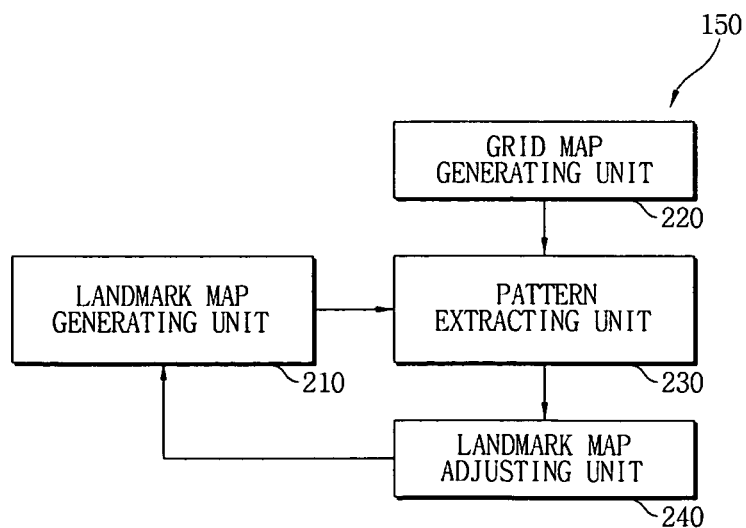
FIG. 2 is a block diagram of the map generating unit included in the mobile robot in FIG. 1.

FIG. 2 is a block diagram of the map generating unit 150 included in the mobile robot 100 in FIG. 1. According to an exemplary embodiment, the map generating unit 150 may include a landmark map generating unit 210, a grid map generating unit 220, a pattern extracting unit 230, and a landmark map adjusting unit 240.

The landmark map generating unit 210 extracts a plurality of landmarks from the ceiling image obtained by the image capturing unit 140, and generates a landmark map which includes location information of each extracted landmark and a local image for each landmark.

The grip map generating unit 220 generates a grip map using location information based on the amounts of movement and rotation from the mobile robot 100 and an obstacle detecting information from the sensing unit 120.

The pattern extracting unit 230 extracts a pattern formed of landmarks of the same kind by using the location information and images. To this end, the pattern extracting unit 230 puts the landmarks of the same kind into a group based on the similarities between local images for the landmarks, and extracts the pattern formed of the landmarks of the same kind by using the location information. According to an exemplary embodiment, the pattern extracting unit 230 sets a line of a given length and thickness such that the landmarks of the same kind can be included in the line, and compares the thickness with the length of the line, and if the ratio of the thickness to the length is smaller than a predetermined value, a pattern of the landmarks of the same kind existing on the same line may be extracted.

Figure 6:
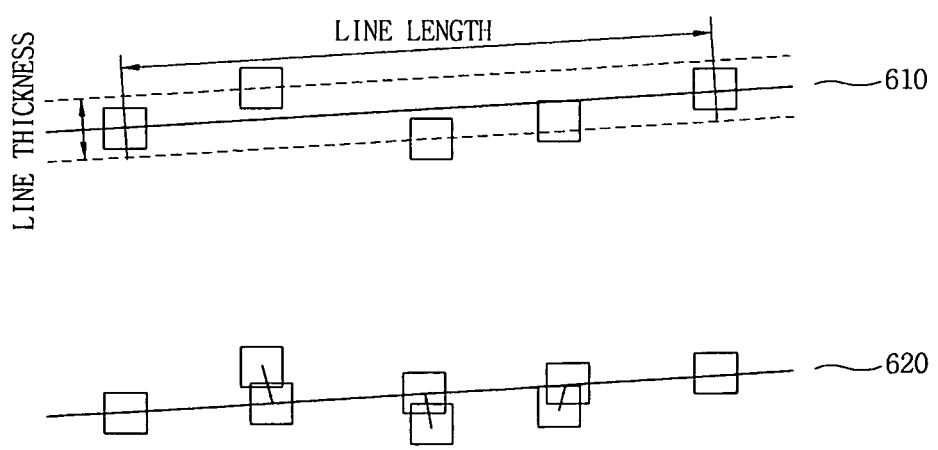
FIG. 6 shows illustrations for explaining how to adjust a landmark map based on a pattern comprised of landmarks according to an exemplary embodiment.

The landmark map adjusting unit 240 adjusts the landmark map using the extracted pattern. The landmark map adjusting unit 240 may adjust the landmarks of the same kind to be placed on the same line when it is determined that landmarks of the same kind are present on the same line. An example of how to adjust the landmark map based on the extracted pattern of the landmarks is shown in FIG. 6.

Figure 7A:
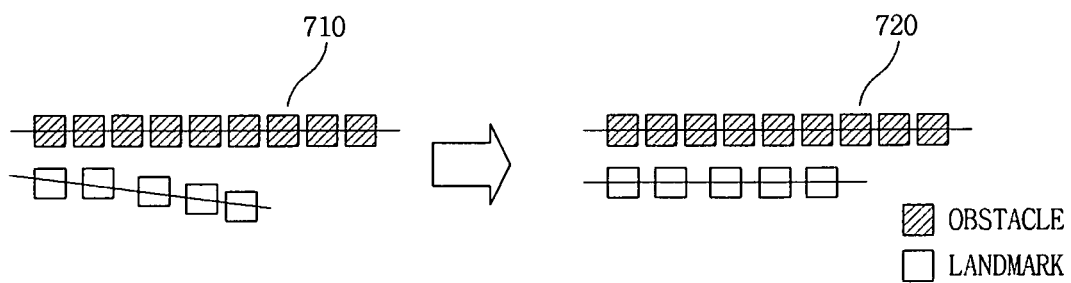
FIGS. 7A and 7B are illustrations for explaining how to adjust a landmark map by using obstacle information and location information of landmark of a grid map according to an exemplary embodiment.
Figure 7B:
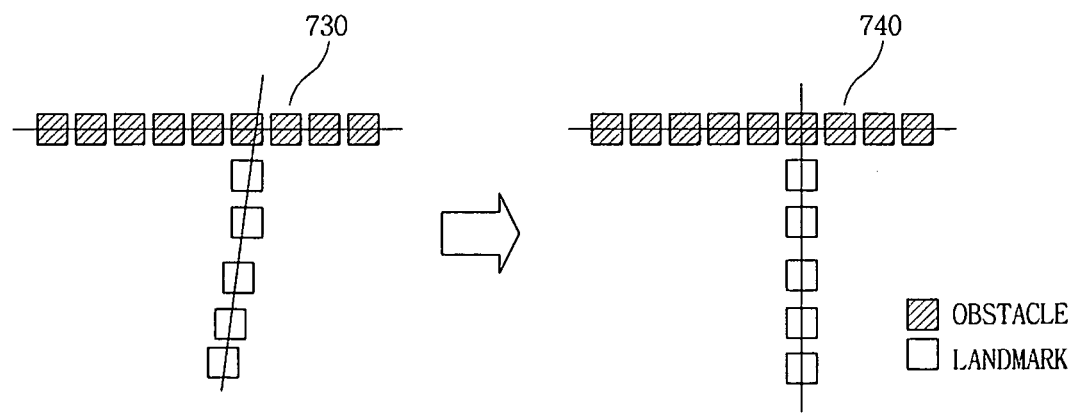

The pattern extracting unit 230 may extract the relationship between a pattern of obstacle information extracted from the grid map and the pattern of the landmarks of the same kind. In this case, the landmark map adjusting unit 240 may adjust the landmark map by use of the relationship between the pattern of the obstacle information and the pattern formed by the landmarks. The landmark map adjusting unit 240 may adjust the locations of the landmarks of the same kind to be perpendicular or parallel to a straight line generated by pieces of obstacle information. FIGS. 7A and 7B are illustration showing how to amend the landmark map using the relationship between the pattern generated by the obstacle information and the pattern generated by the landmark of the same kind.

Figure 3:
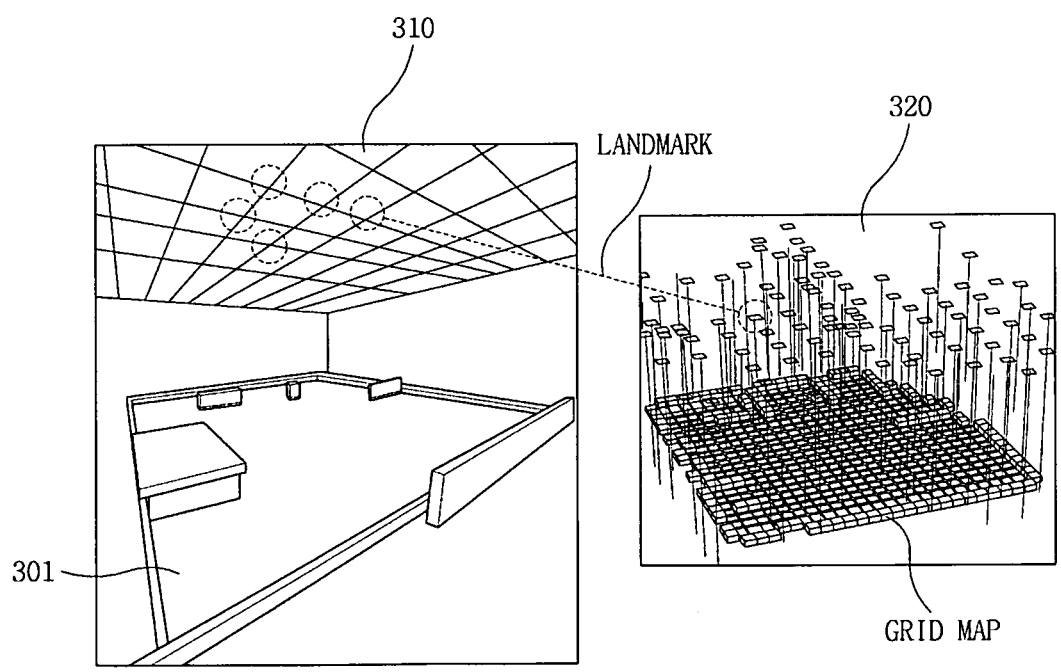
FIG. 3 shows a landmark map represented in a three dimensional space and a grid map displayed also in a three dimensional space.

FIG. 3 shows a landmark map represented in a three dimensional space 310 and a grid map displayed also in a three dimensional space.

A three dimensional space 310 shows an area 301 which is surrounded by low walls and a ceiling with a regular pattern and in which a mobile robot moves, and a map 320 illustrates a grid map and a landmark map displayed in a three dimensional space, showing where the mobile robot has been moved. As shown in FIG. 3, intersection points of a grid pattern shown on a ceiling image may be extracted as landmarks.

Figure 4:
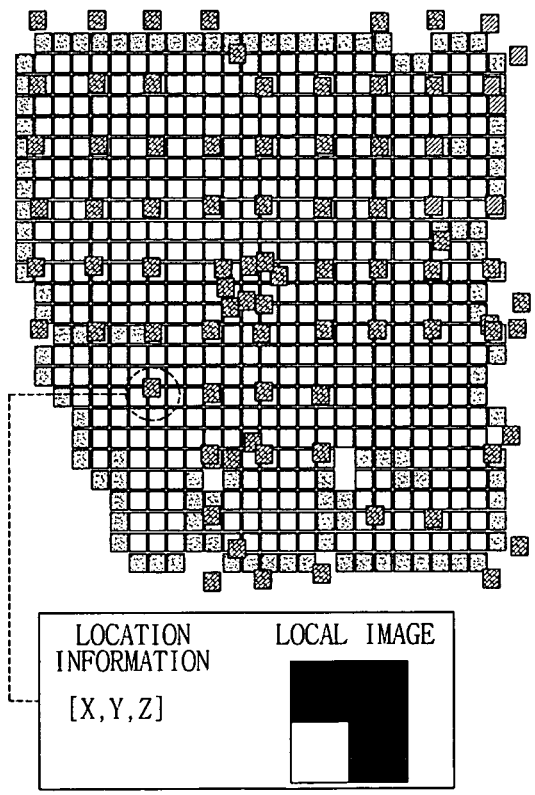
FIG. 4 is an illustration of the landmark map and the grid map in FIG. 3 viewed from the top of the map.

FIG. 4 is an illustration of the landmark map and the grid map in FIG. 3 viewed from the top of the map. As shown in FIG. 4, information of each landmark on the landmark map may include location information and image patch information that is a local image of the landmark.

Figure 5:
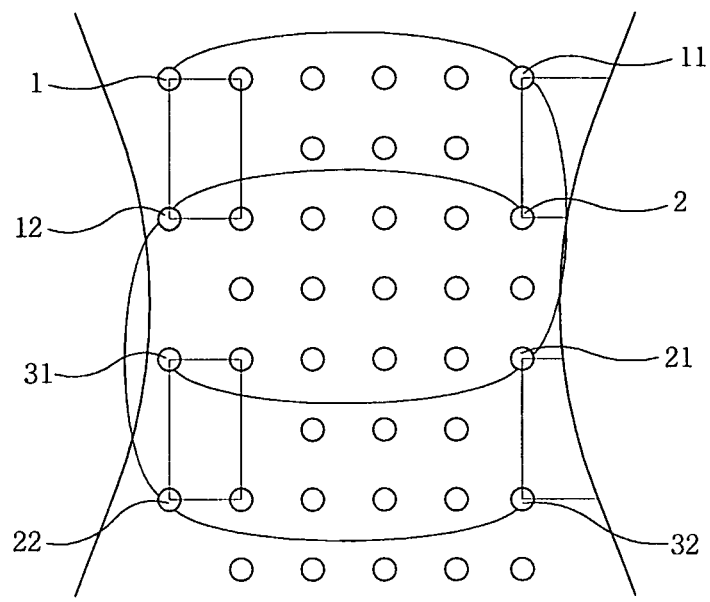
FIG. 5 is an illustration for explaining how to group landmarks according to an exemplary embodiment.

FIG. 5 is an illustration for explaining how to group landmarks according to an exemplary embodiment. According to an exemplary embodiment, similarities of local images of all landmarks are compared to check if there are landmarks of the same kind. The similarities of local images of the landmarks can be compared by use of various method such as normalized cross correlation (NCC) operation, sum of squared difference (SSD) operation, sum of absolute difference (SAD) operation, and mean of absolute difference (MAD) operation.

Referring to FIG. 5, landmarks of a ceiling image are extracted from locations represented as circles, and landmarks extracted from corner points 1, 11, 21, and 31 are grouped together as of the same kind, and landmarks extracted from corner points 2, 12, 22, and 32 are grouped together as of the same kind. In FIG. 5, a rectangle including the corner points 1 and 12 represents a florescent lamp on the ceiling.

FIG. 6 shows illustrations for explaining how to adjust a landmark map based on a pattern comprised of landmarks according to an exemplary embodiment.

Reference numeral 610 in FIG. 6 denotes landmarks grouped together as of the same kind. A two dimensional line-like space of a thickness of 'a' and a length of 'b' may be established to include all the grouped landmarks.

When the ratio of the line thickness 'a' to the line length 'b' is smaller than a predetermined ratio, for example, 1/100, the landmarks of the same kind can be regarded as being on the same straight line. In this case, as shown by reference numeral 620, locations of the extracted landmarks in the same group may be adjusted to be placed on the same straight line.

FIGS. 7A and 7B are illustrations for explaining how to adjust a landmark map by using obstacle information and location information of landmark of a grid map according to an exemplary embodiment.

Reference numeral 710 in FIG. 7A denotes obstacle information obtained from a grid map and a group of landmarks of the same kind obtained from a landmark map. As shown by reference numeral 710, an obstacle line including a grid array of obstacles is set, and a landmark line including groups of landmarks of the same kind is set. In this case, when an angle between the obstacle line and the landmark line is close to 0 degrees, for example, when the angle is within a range of −5 degrees to 5 degrees, it is determined that the obstacle line and the landmark line are parallel to each other.

If it is determined that the landmark line is parallel to the obstacle line, as shown by reference numeral 720, the landmark line is adjusted to be parallel to the obstacle line. Then, the landmarks which are on the landmark line before adjustment may also be repositioned to be placed on the adjusted landmark line.

Reference numeral 730 in FIG. 7B denotes obstacle information obtained from a grid map and a group of landmarks of the same kind detected from the landmark map. As shown by reference numeral 730, an obstacle line including a grid arrangement of obstacles is set, and a landmark line including groups of landmarks of the same kind is set. In this case, if the obstacle line is close to perpendicular to and the landmark line, that is, the angle between the obstacle line and the landmark line is within a range of 85 degrees to 95 degrees, it is determined that the obstacle line and the landmark line are perpendicular to each other.

Once it is determined that the landmark line is perpendicular to the obstacle line, as shown by reference numeral 740, the landmark line is adjusted to be perpendicular to the obstacle line. Then, the landmarks which have been on the previous landmark line before the adjustment are repositioned to be placed on the adjusted landmark line.

Figure 8:
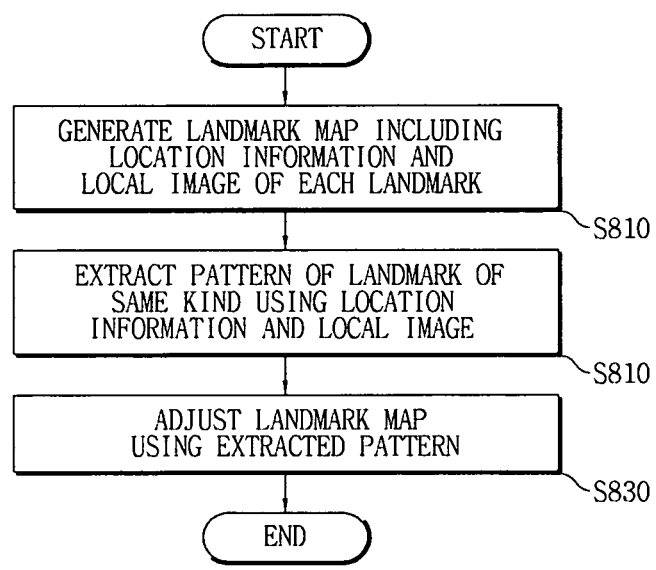
FIG. 8 is a flowchart of a method of how to build a landmark map according to an exemplary embodiment.

FIG. 8 is a flowchart of a method of how to build a landmark map according to an exemplary embodiment.

A landmark map is formed including location information and a local image of each of a plurality of landmarks (operation S810). Using the location information and local image, a pattern formed by landmark of the same kind is extracted (operation S820). The pattern formed by the landmarks of the same kind may be one of a straight line, a circle, and a rectangle.

To perform operation of extracting the pattern (operation S820), the landmarks of the same kind are grouped together on the basis of similarities of images associated with respective landmarks, and a pattern formed by the grouped landmarks of the same kind is extracted by use of location information of each landmark.

Using the extracted pattern, a landmark map is adjusted (operation S830).

Meanwhile, during extracting the pattern (operation S820), a pattern of obstacle information extracted from a grid map may be detected. In the course of adjusting the landmark map (operation S830), the pattern of the extracted obstacle information and the pattern of the landmarks of the same kind are compared to each other, and the landmark map may be adjusted based on the comparison result. For example, when the pattern of the landmarks of the same kind and the pattern of obstacle information are straight lines, the straight line of the landmark pattern may be adjusted to be parallel or perpendicular to the straight line of the obstacle information.

As described above, according to an exemplary embodiment, since a landmark map is adjusted based on a pattern extracted on the basis of the location information of landmarks of the same kind, localization of a mobile robot and accuracy of map-building in a wide space such as the airport, a public office, and a lobby of a large building can be enhanced. Additionally, a SLAM error due to inaccurate odometry, for example, an angular error due to a gyro error of a cleaning robot can be corrected.

The above-mentioned method according to the present embodiment of the invention may be implemented through computer readable code stored in any form of recording media, such as CD-ROM, RAM, ROM, floppy disk, hard disk, or magneto-optical disk, or in any computer-readable form, such as computer code organized into executable programs.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents.

Accordingly, although a few embodiments have been shown and described, it would be appreciated by those skilled in the art that changes may be made in these embodiments without departing from the principles and spirit of the invention, the scope of which is defined in the claims and their equivalents.

What is claimed is:

1. A map building apparatus comprising:
    a landmark map generating unit, comprising at least one processing device, to generate a landmark map which includes location information and respective local images of each of a plurality of landmarks;
    a pattern extracting unit to extract a pattern formed by grouping landmarks, of the plurality of landmarks, identified as being of a same kind by use of the location information and the local images; and
    a landmark map adjusting unit to adjust the landmark map in accordance with a comparison between obstacle information and the extracted pattern formed by grouping the landmarks of the identified same kind by repositioning at least one landmark based on the comparison.

2. The map building apparatus of claim 1, wherein the pattern extracting unit groups together landmarks of the identified same kind based on similarities of the local images of the landmarks and extracts the pattern formed by the landmarks of the identified same kind by use of the location information.

3. The map building apparatus of claim 1, wherein the extracted pattern formed by the landmarks of the identified same kind is at least one of a straight line, a circle, and a rectangle.

4. The map building apparatus of claim 1, further comprising:
    an image capturing unit which is configured to capture an image of a ceiling and obtains the respective local images for respective landmarks from the ceiling image.

5. The map building apparatus of claim 1, wherein the map building apparatus is a mobile robot of which location is recognized and movement is controlled based on the adjusted landmark map.

6. A map building apparatus comprising:
    a landmark map generating unit, comprising at least one processing device, to generate a landmark map which includes location information and respective local images of each of a plurality of landmarks;
    a pattern extracting unit to extract a pattern formed by grouping landmarks, of the plurality of landmarks, identified as being of a same kind by use of the location information and the local images; and
    a landmark map adjusting unit to adjust the landmark map in accordance with a comparison between obstacle information and the extracted pattern formed by grouping the landmarks of the identified same kind,
    further comprising:
    a grid map generating unit which generates a grid map,
    wherein the pattern extracting unit extracts a pattern of obstacle information from the grid map and compares the extracted pattern of obstacle information with the extracted pattern formed by the landmarks of the identified same kind, and the landmark map adjusting unit adjusts the landmark map based on a result of the comparison.

7. The map building apparatus of claim 6, wherein the landmark map adjusting unit adjusts locations of the landmarks to be perpendicular or parallel to a straight line corresponding to the extracted pattern of obstacle information when the extracted pattern of obstacle information and the extracted pattern formed by the landmarks of the identified same kind are determined to be straight lines.

8. A map building apparatus comprising:
    a landmark map generating unit, comprising at least one processing device, to generate a landmark map which includes location information and respective local images of each of a plurality of landmarks;
    a pattern extracting unit to extract a pattern formed by grouping landmarks, of the plurality of landmarks, identified as being of a same kind by use of the location information and the local images; and
    a landmark map adjusting unit to adjust the landmark map in accordance with a comparison between obstacle information and the extracted pattern formed by grouping the landmarks of the identified same kind,
    wherein, when the extracted pattern formed by the landmarks of the identified same kind is determined to be a straight line, the landmark map adjusting unit repositions the landmarks to be placed on a corresponding straight line.

9. A map building method comprising:
    generating, by a processor, a landmark map including location information and respective local images of each of a plurality of landmarks;
    extracting a pattern formed by grouping landmarks, of the plurality of landmarks, identified as being of a same kind by use of the location information and the local images; and
    adjusting the landmark map in accordance with a comparison between obstacle information and the extracted pattern formed by grouping the landmarks identified of the identified same kind by repositioning at least one landmark based on the comparison.

10. The map building method of claim 9, wherein the extracting of the pattern includes grouping together landmarks of the identified same kind based on similarities of the local images of the landmarks and extracting the pattern formed by the landmarks of the identified same kind by use of the location information.

11. The map building method of claim 9, wherein the extracted pattern formed by the landmarks of the identified same kind is one of a straight line, a circle, and a rectangle.

12. The map building method of claim 9, wherein the respective local images of each landmark are obtained from a ceiling image.

13. A map building method comprising:
    generating, by a processor, a landmark map including location information and respective local images of each of a plurality of landmarks;

extracting a pattern formed by grouping landmarks, of the plurality of landmarks, identified as being of a same kind by use of the location information and the local images;

adjusting the landmark map by use of the extracted pattern formed by grouping the landmarks identified of the identified same kind;

generating a grid map;

extracting a pattern of obstacle information from the grid map; and comparing the extracted pattern of obstacle information with the extracted pattern formed by the landmarks of the same kind, wherein, in the adjusting of the landmark map by use of the extracted pattern formed by the landmarks of the identified same kind, the landmark map is adjusted based on a result of the comparing of the extracted pattern of obstacle information and the extracted pattern formed by the landmarks of the identified same kind.

14. The map building method of claim 13, wherein, in the adjusting of the landmark map, when the extracted pattern formed by the landmarks of the identified same kind and the extracted pattern of obstacle information are determined to be straight lines, the landmarks of the identified same kind are repositioned to be perpendicular or parallel to a straight line corresponding to the extracted pattern of obstacle information.

15. A map building method comprising:

generating, by a processor, a landmark map including location information and respective local images of each of a plurality of landmarks;

extracting a pattern formed by grouping landmarks, of the plurality of landmarks, identified as being of a same kind by use of the location information and the local images; and adjusting the landmark map by use of the extracted pattern formed by grouping the landmarks identified of the identified same kind, wherein, when the extracted pattern formed by the landmarks of the identified same kind is determined to be a straight line during the extracting of the pattern formed by the landmarks of the identified same kind, by use of the location information and the local images, the landmarks of the identified same kind are repositioned to be placed on the determined straight line.

16. A map building method comprising:

generating, by a processor, a landmark map including a plurality of landmarks and a grid map including obstacle information;

grouping landmarks, of the plurality of landmarks, by comparing whether or not the landmarks are of a same kind;

extracting a pattern, based on the grouped landmarks; and adjusting the landmark map using a comparison between the extracted pattern and the obstacle information by repositioning at least one landmark based on the comparison.

* * * * *

UNITED STATES PATENT AND TRADEMARK OFFICE
CERTIFICATE OF CORRECTION

PATENT NO.          : 8,508,527 B2                                           Page 1 of 1
APPLICATION NO.     : 12/320289
DATED               : August 13, 2013
INVENTOR(S)         : Woo-yeon Jeong et al.

It is certified that error appears in the above-identified patent and that said Letters Patent is hereby corrected as shown below:

On the Title Page, In Column 2 (Other Publications), Line 3, Delete "Proceeding S" and insert
-- Proceedings --, therefor.

Signed and Sealed this
Eighteenth Day of February, 2014

Michelle K. Lee
*Deputy Director of the United States Patent and Trademark Office*